United States Patent
Sharp

[11] 4,102,376
[45] Jul. 25, 1978

[54] FRUIT PICKING RECEPTACLE

[76] Inventor: David E. Sharp, Ji-Meva Farms, P.O. Box 259, North Rose, N.Y. 14516

[21] Appl. No.: 815,944

[22] Filed: Jul. 15, 1977

[51] Int. Cl.² .................................................. A01D 46/22
[52] U.S. Cl. ...................................... 150/2; 220/403; 206/523
[58] Field of Search .............. 229/14 B, 14 BE, 14 C; 150/2; 220/63 R

[56] References Cited

U.S. PATENT DOCUMENTS

| | | | |
|---|---|---|---|
| 496,024 | 4/1893 | Warner | 150/2 |
| 691,376 | 1/1902 | Harter | 150/2 |
| 2,586,974 | 2/1952 | Merrion | 150/2 |
| 2,620,004 | 12/1952 | Heitmeyer | 150/2 |
| 2,673,024 | 3/1954 | Kuss | 229/14 BE X |
| 3,344,973 | 10/1967 | Studen | 229/14 C X |
| 3,352,449 | 11/1967 | Jackson | 220/63 R |

Primary Examiner—Donald F. Norton
Attorney, Agent, or Firm—Charles S. McGuire

[57] ABSTRACT

A receptacle for hand-picked fruit which is susceptible to damage by crushing or bruising. A conventional picking bag or bucket is provided with a removable liner which is preferably formed from a single, flat sheet of a closed-cell foam plastic material. The liner is bent to conform to the cylindrical configuration of the picking bag or bucket wherein it is inserted, and does not interfere with use in the normal manner of canvas picking bags which are adapted for fruit discharge through the bottom.

4 Claims, 3 Drawing Figures

FRUIT PICKING RECEPTACLE

BACKGROUND OF THE INVENTION

The present invention relates to receptacles for hand-picked fruit, and the like, and more specifically to picking bags with protective liners.

Apples and other fruit are often hand-picked and placed in an open bag carried by the picker which is periodically emptied by opening the bottom of the bag. The bag is usually made from canvas, or a similar heavy fabric, in the form of a cylinder open at both ends. One end is folded over and attached to an outer wall to form the bottom of the bag, which may be released from its attachment on the outside of the bag to allow the contents to empty through the lower open end. A metal framework is sometimes provided to maintain the cylindrical configuration of the bag while in use.

Although a shoulder strap, or similar carrying means, is commonly provided on such picking bags, it is frequently more comfortable or convenient for the picker to rest the bag on a tree limb or ladder rung while picking and depositing fruit in the bag. Also, in handling the bag when partly or fully filled with fruit, it is often hit against the ladder, limbs, etc. In either case the fruit is subject to bruising or crushing which is often severe enough to materially lessen the value of the fruit.

Attempts to reinforce or reconstruct picking bags to provide greater protection from the fruit have never met with a great deal of success since they have tended to create other problems, some of them equally as objectionable as the aforementioned fruit damage. For example, bags made of thicker material, more protective to the fruit, are often too heavy or cumbersome for convenient use. Some materials which have been used are spongy and absorb a large amount of water, with obvious disadvantages.

It is a principal object of the present invention to provide a receptacle for hand-picked fruit which effectively protects the fruit from bruising while in the receptacle, yet does not materially add to its weight or bulk.

A further object is to provide a picking bag for apples, or the like, which allows the use of conventional, bottom-opening picking bags with supporting metal framework while protecting the fruit with a removable bag liner.

Another object is to provide a removable, protective, picking bag liner which will not absorb water to any noticeable extent and is adaptable for use with various sizes of bags.

A still further object is to provide a receptacle for hand-picked fruit wherein a one-piece, removable liner provides protection for fruit within a conventional canvas picking bag while at the same time reducing repair and maintenance costs for the bags by providing internal protection thereto and by allowing the use of worn bags with holes or rips without danger of fruit loss.

Other objects will in part be obvious and will in part appear hereinafter.

BRIEF SUMMARY OF THE INVENTION

In accordance with the foregoing objects the invention contemplates a conventional picking bag of canvas, or similar heavy fabric, in combination with a lightweight, durable liner which may be selectively placed within or removed from the bag. The liner is formed by cutting a single, flat sheet of a flexible, closed-cell plastic foam in a rectangular shape with a substantially semi-circular portion extending integrally from one of the long edges. The rectangular portion is bent along its long edges and the short edges overlapped to form a cylindrical wall and the semi-circular portion is folded under to provide a bottom wall.

The liner is then inserted into the cylindrical picking bag and lies in essentially contacting relation with the interior of the side and bottom walls thereof. When so positioned, the liner protects fruit which is deposited in the bag from bruising by striking solid objects with which the exterior of the bag is in contact.

DETAILED DESCRIPTION

Figure 1:
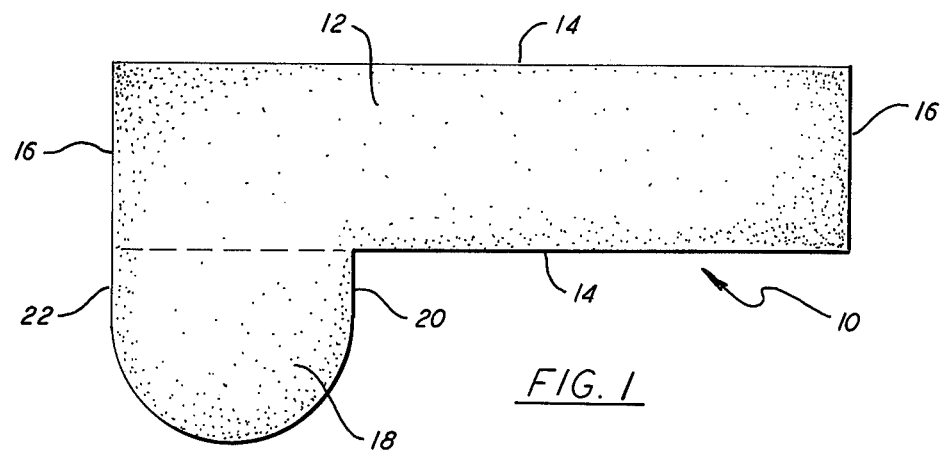
FIG. 1 is a plan view of the liner of the present invention.
Figure 2:
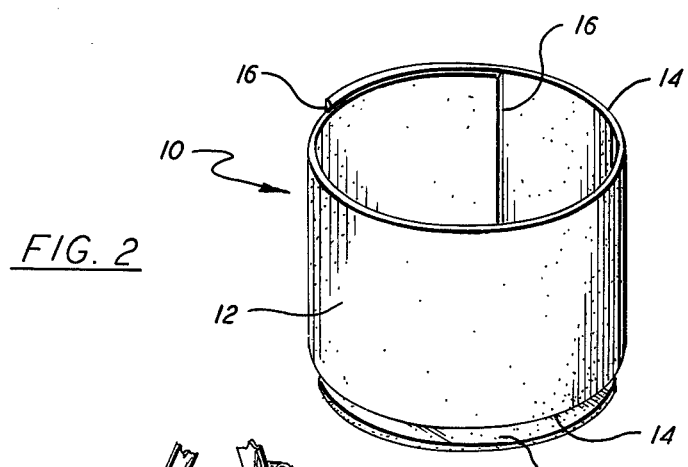
FIG. 2 is a perspective view of the liner folded for insertion in the picking bag.

Referring now to the drawings, the liner of the invention, denoted generally by reference numeral 10, is shown in FIGS. 1 and 2 in flat and folded form, respectively. Liner 10 is preferably cut from a single, flat sheet of a closed-cell, smooth skin, plastic foam material, such as expanded polyethylene on the order of ¼ inch to ½ inch in thickness. A preferred material is that manufactured by Dow Chemical Co., of Midland, Michigan, under the trade name Dow Ethafoam 220 which is available in rolls 60 inches wide, a convenient dimension for fabricating the liners of the present invention. When laid flat, as seen in FIG. 1, liner 10 includes a rectangular portion 12, having long sides 14 and short sides 16, with a substantially semi-circular portion 18 extending integrally from one of long sides 14. Relatively short, parallel, straight edges 20 may be included in portion 18 between the diameter of the semi-circular and the edge of the rectangle from which it extends.

For insertion in a picking bag, the flat blank shown in FIG. 1 is bent along edges 14 to bring rectangular portion 12 into the cylindrical configuration of FIG. 2. Short edges 16 are overlapped to the extent necessary to form the desired diameter of the cylinder. Portion 18 is bent under so that the peripheral edge thereof is substantially adjacent the lower of edges 14, whereby portion 18 forms a bottom well.

Figure 3:
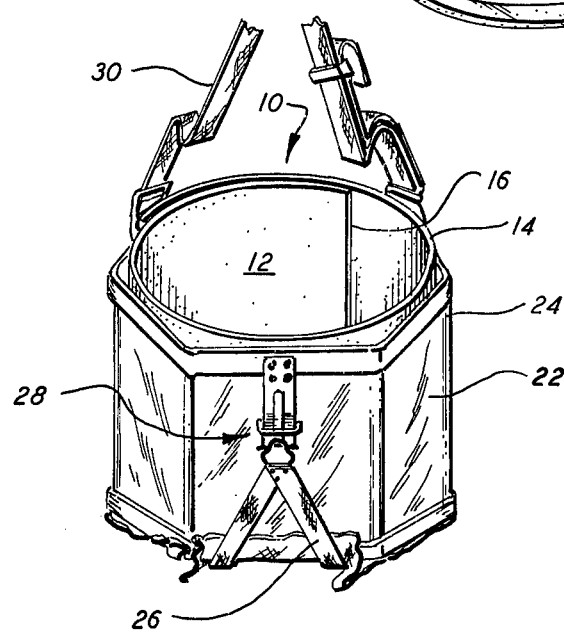
FIG. 3 is a perspective view of the picking bag and liner in assembled relation.

Picking bag 22, of conventional design, is seen in FIG. 3 with liner 10 inserted therein. Bag 22 is formed of canvas, or similar heavy fabric, sewn in a cylindrical configuration, open at both ends. Bag 22 is supported internally of rigid, open, metal framework 24, also of conventional design, consisting of upper and lower members, formed in a circular, hexagonal or other closed configuration, joined by straight rods or bars. Bag 22 may be folded over the upper and lower open members of framework 24, or otherwise maintained thereby in an essentially cylindrical configuration. Strap 26 is affixed to both ends to spaced points on bag 22 and is so proportioned that it may be passed under bag 22 and fastened by means of releasable clasp 28 at a third point on the exterior of the bag. This serves to fold over and close the lower end of bag 22, thus forming in effect a bottom wall of the bag. Adjustable carrying strap 30 is also attached at both ends to bag 22 or to framework 24.

With bag 22 supported on framework 24 and clasp 28 secured so that the bag is closed at the bottom, liner 10 is inserted in the manner shown in FIG. 3. When so positioned, liner 10 covers essentially the entire interior of bag 22; although it is thick and resilient enough to protect fruit deposited in the lined bag from bruising, it does not materially decrease the volume or increase the weight of the bag. Clasp 28 may be released at any time to allow the lower end of bag 22 to open and discharge the contents. Portion 18 of liner 10 likewise opens, whereby the liner does not interfere in any way with the use of bag 22 in the normal manner. Liner 10 may be used only when picking fresh fruit to be eaten out of hand, wherein perfect fruit quality is most desirable, and not used when picking fruit for processing by canners, etc., if so desired. Liner 10 may obviously be adapted to use with bags of various sizes and allows the use of bags with holes or rips without loss of fruit, thereby prolonging bag life and reducing the expenses of bag repair.

Although shown and described in connection with a flexible cloth bag, supported by a metal framework, liner 10 may also be used as a removable, protective liner for rigid metal fruit receptacles such as picking buckets.

What is claimed is:

1. A receptacle for use in hand-picking fresh fruit, or the like, of a type susceptable to damage by bruising, said receptacle comprising, in combination;
   a. a substantially cylindrical container having side and bottom walls and an open top; and
   b. a removable liner formed from a single, flat sheet of flexible, resilient, non-absorbent plastic material and deformable to a configuration substantially conforming to that of the interior of said container, said liner being placed within but unattached to said container and having a thickness and resilience such that fruit deposited in said container is protected by said liner from bruising by contact with said container or objects externally thereof with which said container comes into contact;
   c. said liner when laid flat being rectangular with a semi-circular portion extending from one of the long edges thereof, whereby the short edges may be overlapped to form a cylindrical side wall and the semi-circular portion bent substantially at its junction with the rectangular portion to form a bottom wall for insertion in said bag.

2. The invention according to claim 1 wherein said container is a bottom-opening, canvas picking bag.

3. The invention according to claim 2 and further including a metal framework which supports and maintains the cylindrical configuration of said picking bag.

4. The invention according to claim 1 wherein said liner is composed entirely of a closed-cell plastic foam material.

* * * * *